United States Patent
Osakabe et al.

(10) Patent No.: US 8,472,086 B2
(45) Date of Patent: *Jun. 25, 2013

(54) SCANNER

(71) Applicants: Yoshinori Osakabe, Seto (JP); Akihiro Sakakibara, Toyota (JP)

(72) Inventors: Yoshinori Osakabe, Seto (JP); Akihiro Sakakibara, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,660

(22) Filed: Oct. 31, 2012

(65) Prior Publication Data

US 2013/0057933 A1 Mar. 7, 2013

Related U.S. Application Data

(63) Continuation of application No. 11/678,642, filed on Feb. 26, 2007, now Pat. No. 8,345,318.

(30) Foreign Application Priority Data

Feb. 27, 2006 (JP) ................................. 2006-050369

(51) Int. Cl.
*H04N 1/21* (2006.01)
*H04N 1/23* (2006.01)
(52) U.S. Cl.
USPC ............................ 358/296; 358/474; 358/498
(58) Field of Classification Search
USPC ......................................... 358/296, 400–498
See application file for complete search history.

(56) References Cited

U.S. PATENT DOCUMENTS

| | | | |
|---|---|---|---|
| 5,060,019 | A | 10/1991 | Fukunaga |
| 5,970,597 | A | 10/1999 | Bedzyk et al. |
| 6,052,142 | A | 4/2000 | Bedzyk et al. |
| 6,244,553 | B1 | 6/2001 | Wang |
| 6,408,161 | B1 | 6/2002 | Minowa et al. |
| 6,806,944 | B2 | 10/2004 | Votipka et al. |
| 7,133,626 | B2 | 11/2006 | Kaiga et al. |
| 7,139,506 | B2 | 11/2006 | Park et al. |

(Continued)

FOREIGN PATENT DOCUMENTS

| | | |
|---|---|---|
| CN | 256788 Y | 8/2003 |
| JP | H03-020810 A | 1/1991 |

(Continued)

OTHER PUBLICATIONS

Chinese Office Action issued in corresponding Chinese Application No. 2007100848171 dated Jul. 4, 2008.

(Continued)

*Primary Examiner* — Richard Zhu
(74) *Attorney, Agent, or Firm* — Baker Botts L.L.P.

(57) ABSTRACT

A scanner is provided with a main body, hinge, cover member, and plurality of sets of pins and pin holes. The main body includes a transparent plate on the top surface for placing a document. The hinge connects the main body and the cover member. The cover member rotates between an opened and closed state with respect to the main body. The cover member has a bottom surface, which contacts the top surface of the main body when closed. The pins are fanned on either the top surface of the main body or the bottom surface of the cover member, while the pin holes are formed on the opposing surface. The plurality of sets adjusts a positional relationship between the main body and the cover member in the closed state.

8 Claims, 13 Drawing Sheets

U.S. PATENT DOCUMENTS

| | | | |
|---|---|---|---|
| 7,295,353 | B2 | 11/2007 | Tseng |
| 7,440,712 | B2 | 10/2008 | Uchida |
| 2005/0088493 | A1 | 4/2005 | Koga |
| 2005/0207810 | A1 | 9/2005 | Fukumura |
| 2005/0242485 | A1 | 11/2005 | Shiohara et al. |
| 2005/0246862 | A1 | 11/2005 | Chen |
| 2006/0158702 | A1 | 7/2006 | Kondo |
| 2007/0201109 | A1 | 8/2007 | Osakabe et al. |
| 2007/0201111 | A1 | 8/2007 | Osakabe et al. |

FOREIGN PATENT DOCUMENTS

| | | | |
|---|---|---|---|
| JP | H05-047805 | A | 2/1993 |
| JP | H05-047806 | A | 2/1993 |
| JP | H06-053368 | A | 2/1994 |
| JP | 2991986 | B2 | 8/1998 |
| JP | H10-282593 | A | 10/1998 |
| JP | 2001-154289 | A | 6/2001 |
| JP | 2001-343791 | A | 12/2001 |
| JP | 2002-303943 | A | 10/2002 |
| JP | 2003-172977 | A | 6/2003 |
| JP | 2004134487 | A | 4/2004 |
| JP | 2004-271781 | A | 9/2004 |
| JP | 2005-101942 | A | 4/2005 |
| JP | 2005125533 | A | 5/2005 |
| JP | 2005-269448 | A | 9/2005 |
| JP | 2005-269450 | A | 9/2005 |
| JP | 2005258025 | A | 9/2005 |
| JP | 2005300796 | A | 10/2005 |
| JP | 2005-314067 | A | 11/2005 |
| JP | 2006-089263 | A | 4/2006 |
| JP | 2007-088996 | A | 4/2007 |
| JP | 2007-228528 | A | 9/2007 |

OTHER PUBLICATIONS

Chinese Office Action issued in corresponding Chinese Application No. 2007100848186 dated Jun. 6, 2008.

Japan Patent Office, Notification of Reasons for Rejection in Japanese Patent Application No. 2006-050370 mailed Jan. 27, 2009.

Japan Patent Office; Notification of Reasons for Rejection in Japanese Patent Application No. 2009-160184 mailed Sep. 29, 2009.

U.S. Patent and Trademark Office, Office Action in co-pending U.S. Appl. No. 11/679,467, Notification Date Mar. 11, 2010.

SCANNER

CROSS-REFERENCE TO RELATED APPLICATION

This application is a continuation application of U.S. patent application Ser. No. 11/678,642 filed on Feb. 26, 2007, which claims priority to Japanese patent Application No. 2006-050369, filed on Feb. 27, 2006, the contents of which are hereby incorporated by reference into the present application.

BACKGROUND OF THE INVENTION

1. Field of the Invention

The present invention relates to a scanner that scans a document placed on the top surface of the main body of the scanner.

2. Description of the Related Art

A scanner incorporated into a copying device, or a facsimile device or a multi function device, as well as an independent scanner is known. Such scanners comprise a main body with image sensor mechanism installed therein, a transparent top surface, and a cover connected to the main body. The cover covers the transparent top surface in its closed state. With such scanners, a document placed on the transparent top surface of the main body is scanned by the image sensor mechanism installed therein. During the scan, the cover covers the transparent top surface, shading the document. Simultaneously, the cover holds the document in place.

The cover of such scanners is rotatably connected to the main body. One technique to connect the cover rotatably to the main body is proposed in the teachings of Japanese Patent Application Publication No. 2005-125533. In the aforementioned technique, the cover is connected to the main body of the scanner by a shaft, in a manner that the cover is rotatable around the shaft with respect to the main body.

With such technique to support the cover rotatably by the shaft, however, a brief recess is yielded between the shaft and the cover, or between the shaft and the main body. Thus, the cover and the main body cannot be precisely connected, resulting in the position of the cover to shift with respect to the main body.

With such shifting of the cover position, the position of the cover with respect to the main body is misaligned. Such misalignment spoils the appearance of the scanner, thus not preferable from the perspectives of design. Moreover, had the shifting of the cover position occur when the cover is being closed, the document placed on the transparent top surface of the main body may be tilted or moved. The document is then scanned in the tilted angle, or only part of the document is scanned. Especially, if the cover includes an auto document feeder that feeds in the document placed on top of the cover out to the transparent top surface underneath the cover, the document may not be fed properly to the glass surface. Due to the shifting of the cover position, malfunction of the auto document feeder may occur.

BRIEF SUMMARY OF THE INVENTION

The objective of the present invention is to prevent the misalignment of the cover and the main body of the scanner. To achieve such objective, the following technique is taught in the present specification.

The scanner disclosed in the present specification comprises a main body, a hinge, a cover member, and a plurality of sets, each set comprising a pin and a pin hole. The main body includes a transparent plate on the top surface, on which a document is placed. The hinge connects the main body and the cover member. The cover member rotates with respect to the main body between an opened state and a closed state. The cover member has a bottom surface, which makes contact with the top surface of the main body in the closed state. The pins are formed on one of the top surface of the main body and the bottom surface of the cover member, while the pin holes are formed on the other of the top surface of the main body and the bottom surface of the cover member.

The plurality of sets determines the alignment of the main body and the cover member in the closed state. The position of the cover member with respect to the main body is determined by the sets; that is, the position of the cover member is determined independently from the hinge. This configuration prevents the position of the cover member to shift due to the recess yielded by the hinge. It maintains the appearance of the scanner, thus preferable from the perspectives of design. The document being scanned in a tilted angle or only part of the document being scanned is efficiently prevented.

DETAILED DESCRIPTION OF THE INVENTION (First Embodiment)

Figure 1:
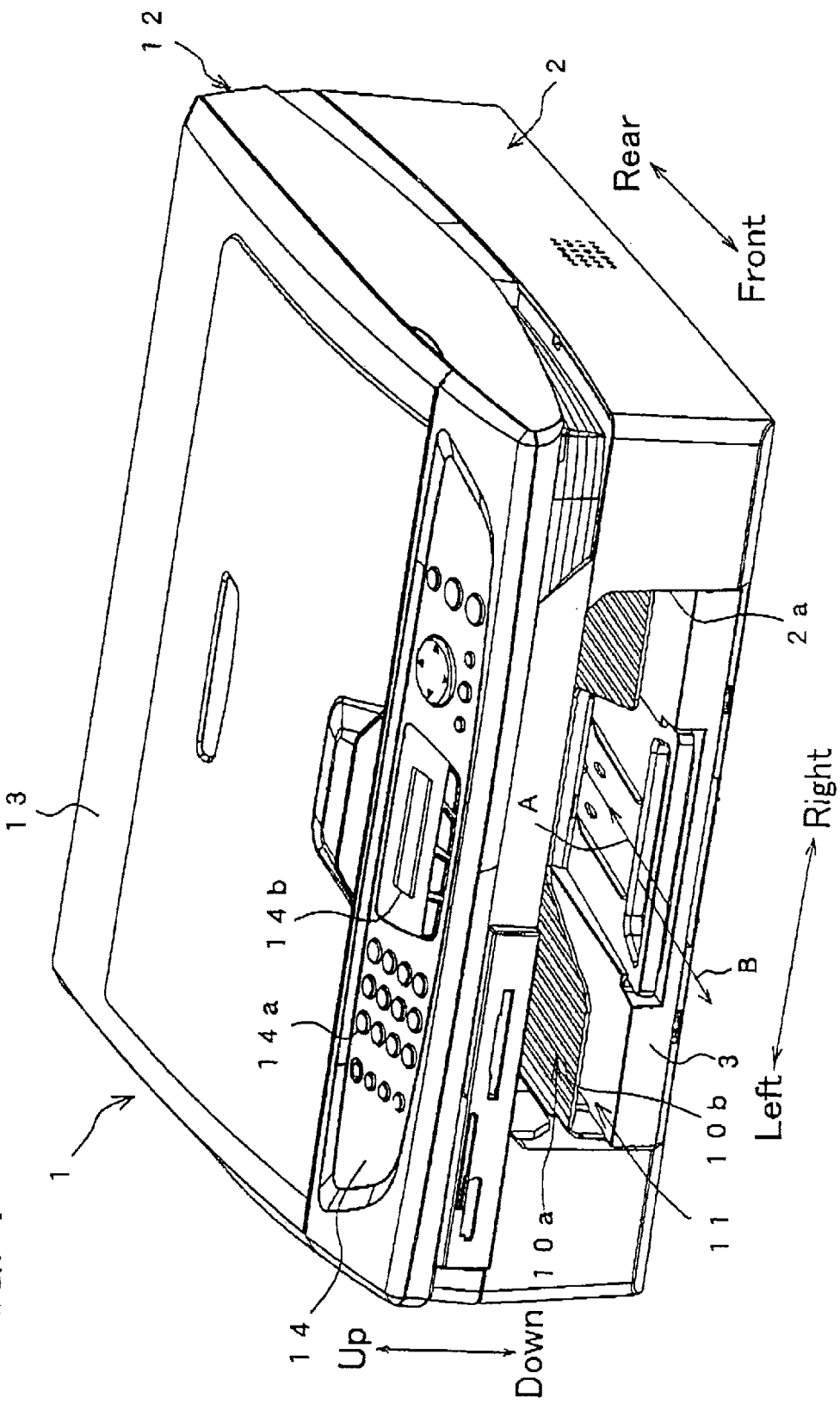
FIG. 1 shows a perspective view of a multi-function device including the scanner of the first embodiment.
Figure 2:
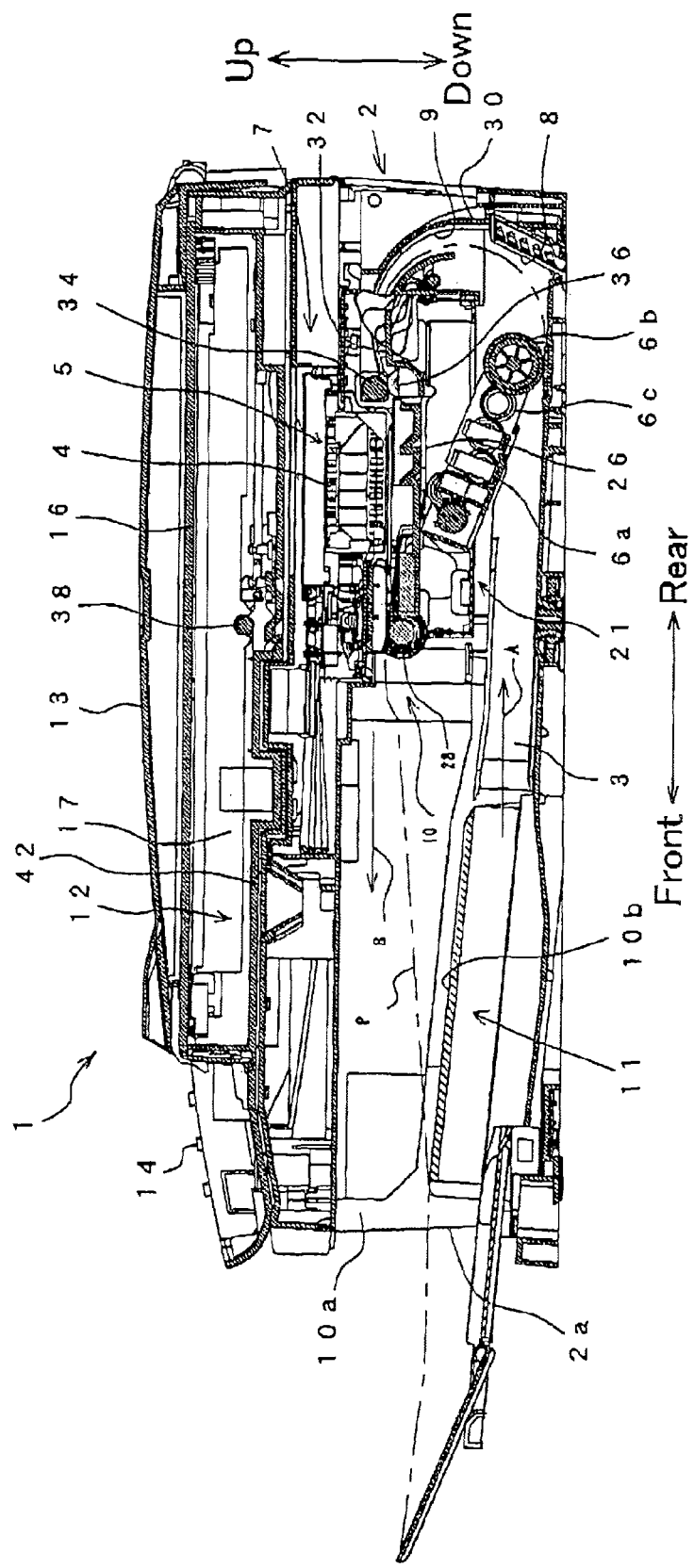
FIG. 2 shows a cross-sectional side view of the multi-function device of FIG. 1.

The first embodiment of the present invention will be described in detail below with reference to the figures. FIG. 1 shows a perspective view of a multi-function device 1 including a scanner 12. FIG. 2 shows a cross-sectional side view of the multi-function device 1 of FIG. 1.

Further, in the description below, the expressions regarding directions will be described based on state in which the multi-function device 1 is normally set up, as shown in FIG. 1. The expressions regarding height directions (the up and down directions) will be described with respect to the side where the cover 13 is formed as the upper side, and the side where the housing 2 is formed as the lower side. The expressions regarding front and rear directions will be described with respect to the side where the operation panel 14 is formed as the front. The expressions regarding left and right directions will be described with respect to the front view of the multi-function device 1.

The multi-function device 1 comprises printing function, scanning function, color copying function, facsimile function, etc. As shown in FIG. 1 and FIG. 2, the multi-function device 1 comprises scanner 12 and housing 2. The scanner 12 to scan a document is formed on the upper side of the housing 2. The housing 2 is made of synthetic resin.

The scanner 12 is fixed on the housing 2 of the multi-function device 1. The scanner 12 in the present embodiment is of a flat bed mechanism. It scans the document placed on the glass plate 16. The cover 13 that covers the upper surface of the scanner 12 is connected to the main body 42 of the scanner 12. The cover 13 is able to rotate with respect to the main body 42, with the axis of the rotation at the rear side of the cover 13.

As shown in FIG. 2, on the top surface of the scanner 12, a glass plate 16 is formed. When the cover 13 is opened, that is, when the cover 13 is rotated towards the upper direction, documents can be placed on the glass plate 16. Underneath the glass plate 16, a Contact Image Sensor (CIS) 17 is installed. CIS 17 is able to move vertically to the space direction shown in FIG. 2, that is, the main scanning direction or the left and right direction shown in FIG. 2.

As shown in FIG. 1 and FIG. 2, an operation panel 14 is disposed in the front of the scanner 12. The operation panel 14 comprises input buttons 14a and LCD 14b to display information such as messages.

On the bottom part of the housing 2, a paper feed-in member 11 is disposed. The paper feed-in member 11 supplies a printing paper P, which is the printing medium. The paper feed-in member 11 includes a detachable paper cassette 3. The paper cassette 3 can be detached from the housing 2 from the front side via the opening 2a. A plurality of printing paper P can be stored in the paper cassette 3 in a stacked state. In the present embodiment, the paper cassette 3 is able to store printing paper P of various sizes, such as the A4 size, letter size, legal size, postcard size, etc. The plurality of the printing paper P can be stacked with its shorter side (the widthwise side) perpendicularly intersecting with the feed-in direction of the printing paper P (the subscanning direction, the front and rear direction, or the direction shown with arrow A in FIG. 2).

As shown in FIG. 2, at the rear side of the paper cassette 3, an inclined separator 8 is disposed. The inclined separator 8 bulges out frontward at the center of the widthwise direction (the left and right direction) of the printing paper P. The bulge recedes towards the left and right ends. From the plane view, the bulge of the inclined separator 8 has curved surface. Further, at the center part of the widthwise direction of the printing paper P, a saw-shaped resilient separator pad is formed. The resilient separator pad enhances the separation of the printing paper P, so that only the printing paper P placed on the top of the stack will be sent out at a time.

The paper feed-in member 11 further includes a paper feed-in arm 6a. One end of the paper feed-in arm 6a is connected to the housing 2. The paper feed-in arm 6a rotates in the up and down direction with respect to the end connected to the housing 2. At the other end of the paper feed-in arm 6a, a paper feed-in roller 6b is equipped. A gear mechanism 6c is disposed in the arm 6a. The drive force from a motor not shown in the figures is transmitted to the paper feed-in roller 6b via the gear mechanism 6c to rotate the paper feed-in roller 6b. The paper feed-in roller 6b and the resilient separator pad of the inclined separator 8 sends out a printing paper P placed at the topmost of the stack in the paper cassette 3 at a time.

The printing paper P separated from the stack is fed in the direction shown with arrow A in FIG. 2. The printing paper P passes through the paper feeding passage 9, which includes the U-shaped passage formed in between the first transfer passage 30 and the second transfer passage 32. The printing paper P is fed into a printing member 7 via the paper feeding passage 9.

The printing member 7 comprises a main frame 21, a print head 4, a carriage 5, and a platen 26. The main frame 21 is box-shaped with its top surface opened. The print head 4 is an inkjet printing head. It prints images on the printing paper P by injecting ink from its bottom surface. The carriage 5 supports the print head 4. The platen 26 is fixed to the main frame 21 below the print head 4. The platen 26 is flat-shaped, and extending in the left and right direction. The platen 26 faces the print head 4, and it supports the printing paper P from the down side.

As shown in FIG. 2, on the up-stream side of the platen 26 with respect to the paper feed-out direction (the direction shown with the arrow B), a drive roller 34 and a nip roller 36 are disposed. The nip roller 36 faces the drive roller 34 from below. The drive roller 34 and the nip roller 36 are resist rollers, which send the printing paper P in between the platen 26 and the printing head 4. On the down-stream side of the platen 26 with respect to the paper feed-out direction (the direction shown with the arrow B), a paper feed-out roller 28 and a spur roller not shown in the figures are disposed. The spur roller faces the exhausting roller 28 and attached to the paper feed-out roller 28. The paper feed-out roller 28 is driven to feed the printing paper P from the printing member 7 out to a paper feed-out member 10 in the paper feed-out direction.

The paper feed-out member 10 is located above the paper feed-in member 11. The paper feed-out member 10 includes an opening 10a and a paper tray 10b. The opening 10a is formed in unity with the opening 2a located at the front side of the housing 2. The paper tray 10b is disposed inside the opening 2a. The printing paper P is fed out from the paper feed-out member 10 in the paper feed-out direction (the direction shown with arrow B) onto the paper tray 10b, and stacked thereon.

Figure 3:
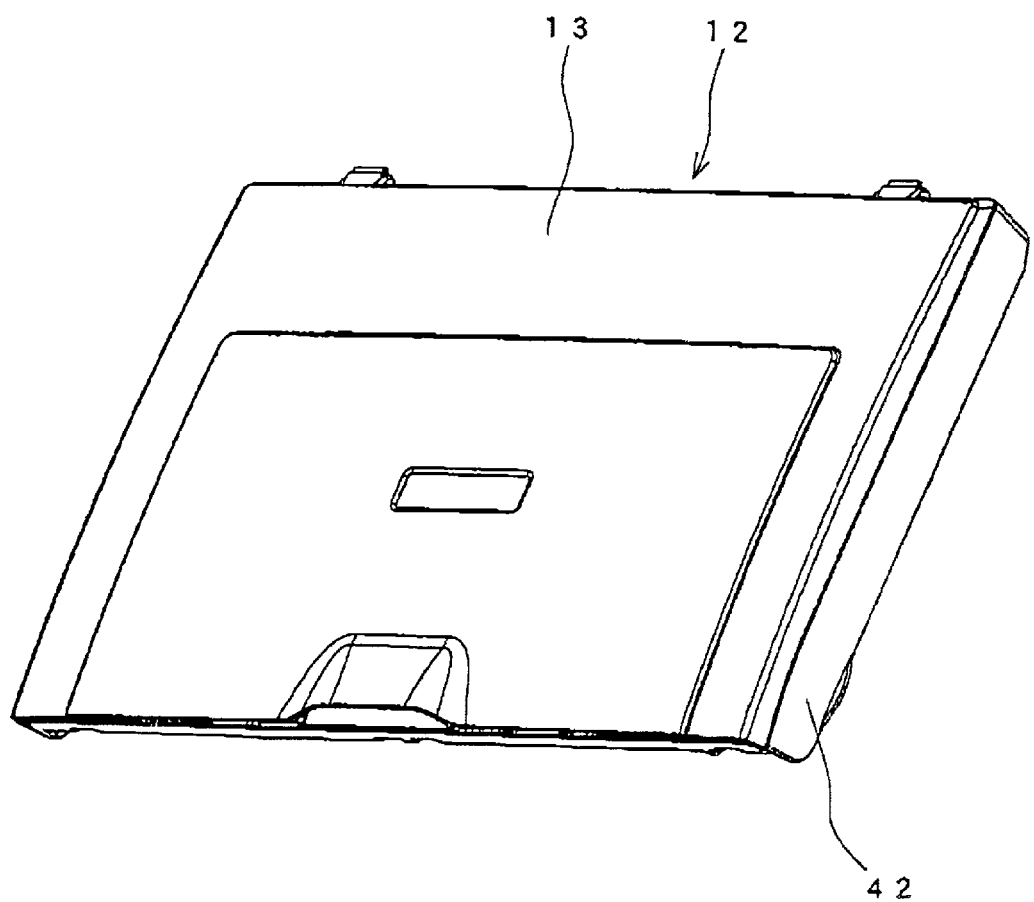
FIG. 3 shows a perspective view of the scanner removed from the multi-function device of FIG. 1.
Figure 4:
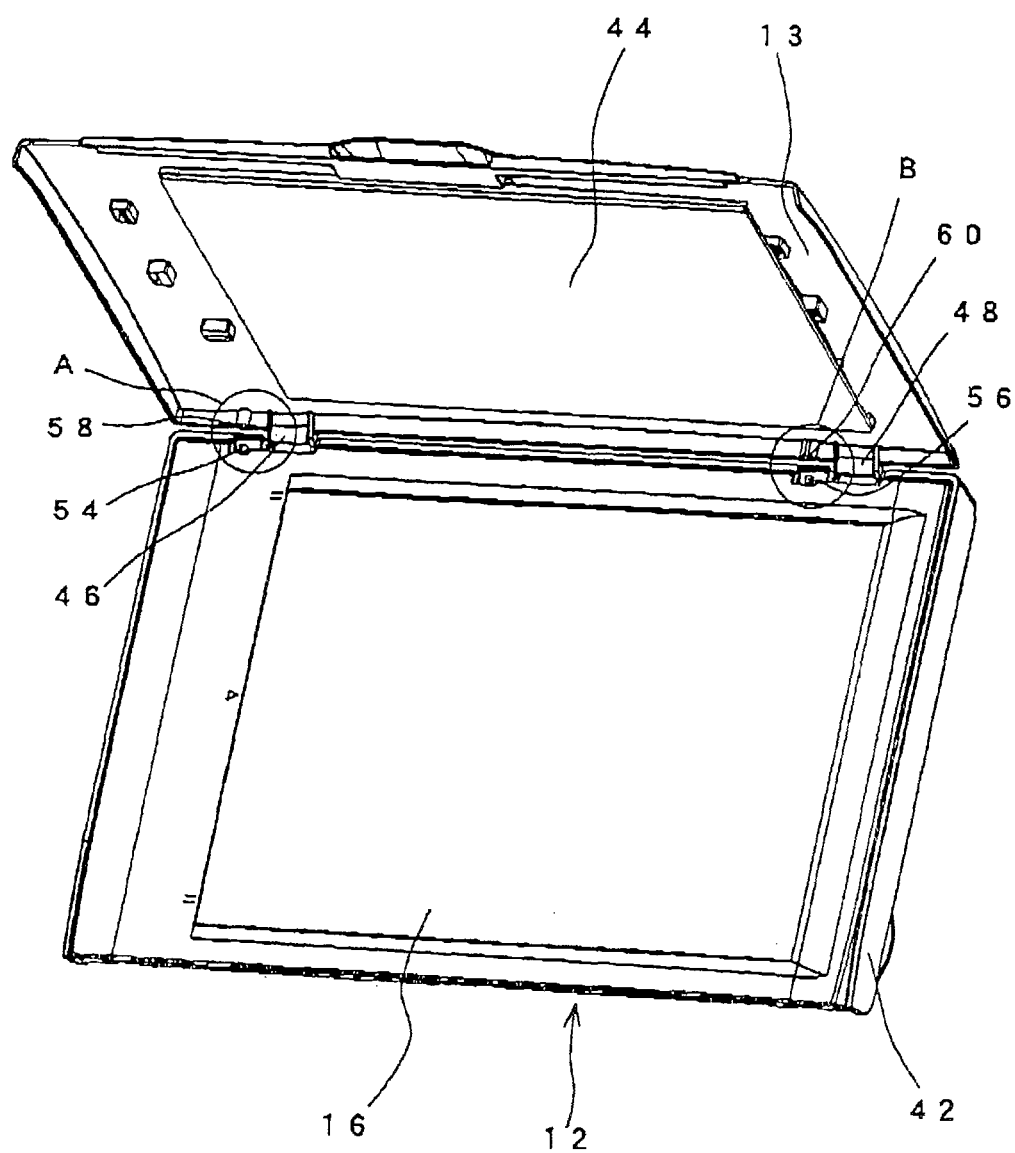
FIG. 4 shows a perspective view of the scanner of FIG. 3, with its cover opened.
Figure 5:
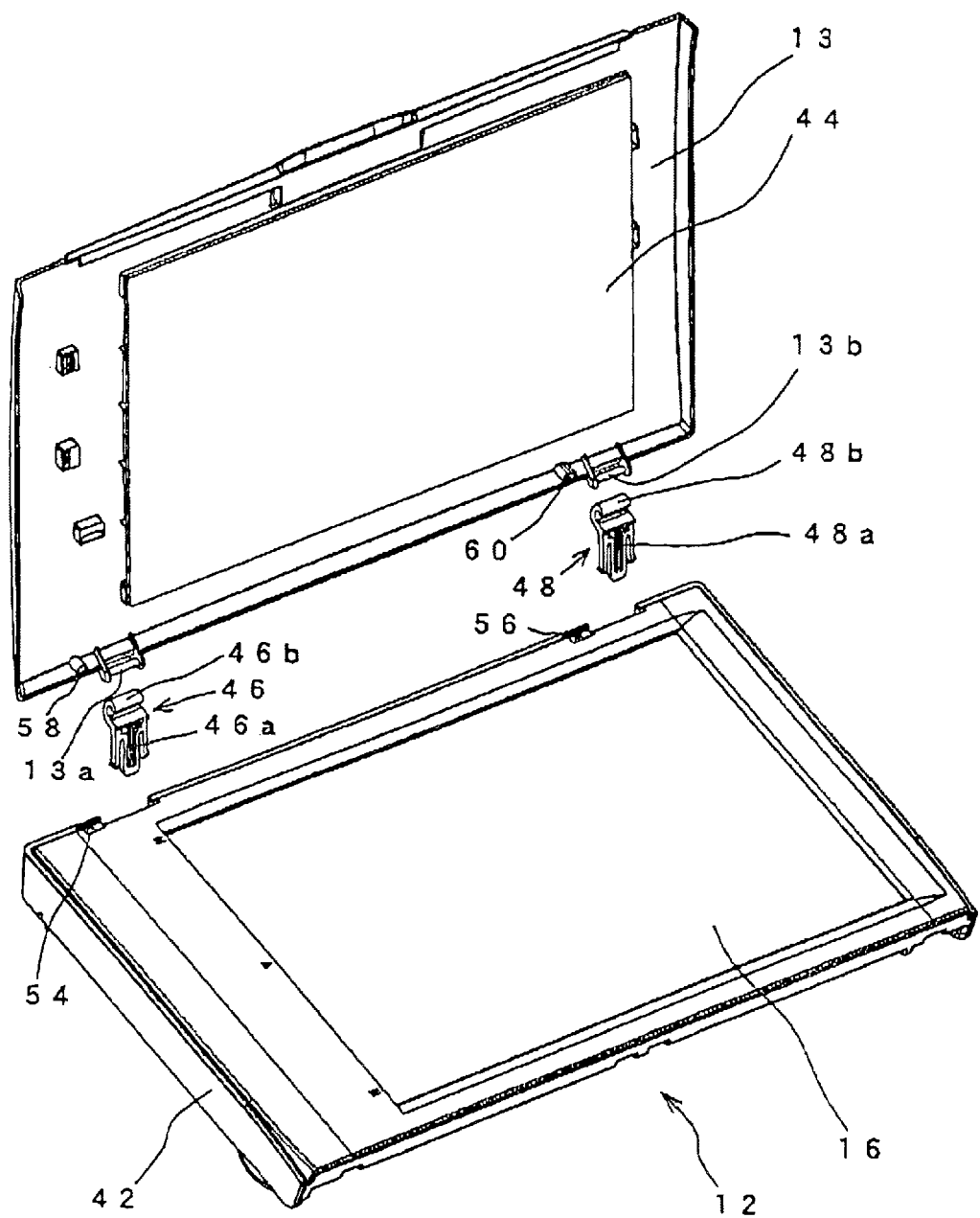
FIG. 5 shows a perspective view of the decomposed elements of the scanner of FIG. 3.

FIG. 3 shows a perspective view of the scanner 12 removed from the multi-function device 1 of FIG. 1. FIG. 4 shows a perspective view of the scanner 12 of FIG. 3, with its cover 13 opened. FIG. 5 shows a perspective view of the decomposed elements of the scanner 12 of FIG. 3.

As shown in FIG. 3 and FIG. 4, the scanner 12 comprises a main body 42. The main body 42 has a shape of a rectangular box made of resin. As shown in FIG. 4, the upper opening of the main body 42 is covered with the aforementioned flat glass plate 16. The glass plate 16 constructs the top surface of the main body 42. The glass plate 16 is a transparent rectangular plate, and documents can be placed thereon. On the bottom surface of the cover 13, that is, on the surface side which makes contact with the glass plate 16 (the top surface of the main body 42) in the closed state, a rectangular weight sponge 44 is adhered. The weight sponge 44 covers the glass plate 16 within an area of which the document is to be placed. In the course of scanning the document, the weight sponge 44 holds the document down onto the glass plate 16. Though not shown in the figures, a white colored resin film is coating the surface of the weight sponge 44.

As shown in FIG. 4 and FIG. 5, a pair of hinges 46, 48 is connected at the rear side of the cover 13 and the main body 42. As is clearly shown in FIG. 5, the hinges 46, 48 each comprise sliding portion 46*a*, 48*a* and rotation support portion 46*b*, 48*b* respectively.

Figure 6:
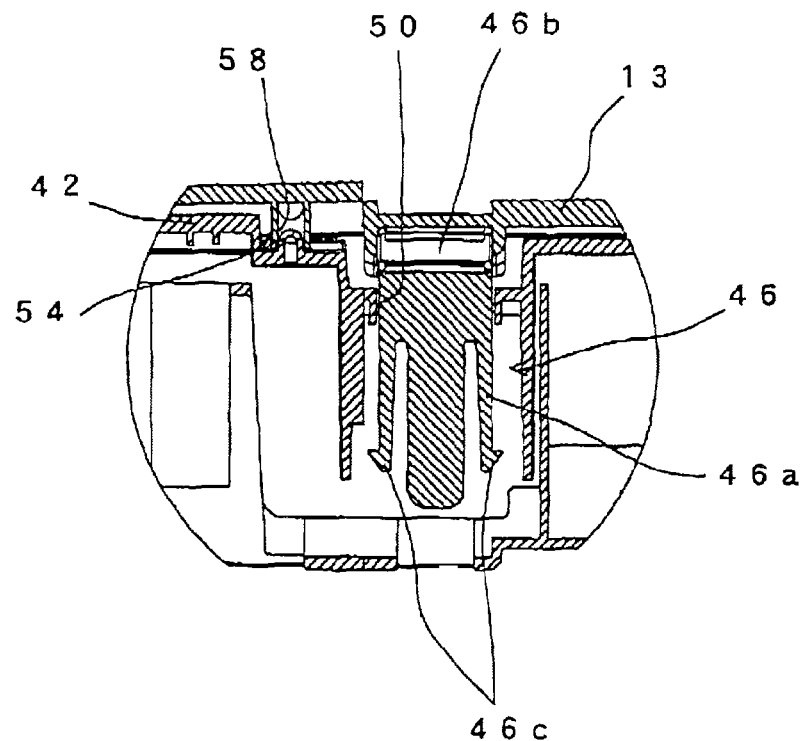
FIG. 6 shows an enlarged perspective view of the left side connection of the cover and the main body of the scanner of FIG. 3.
Figure 7:
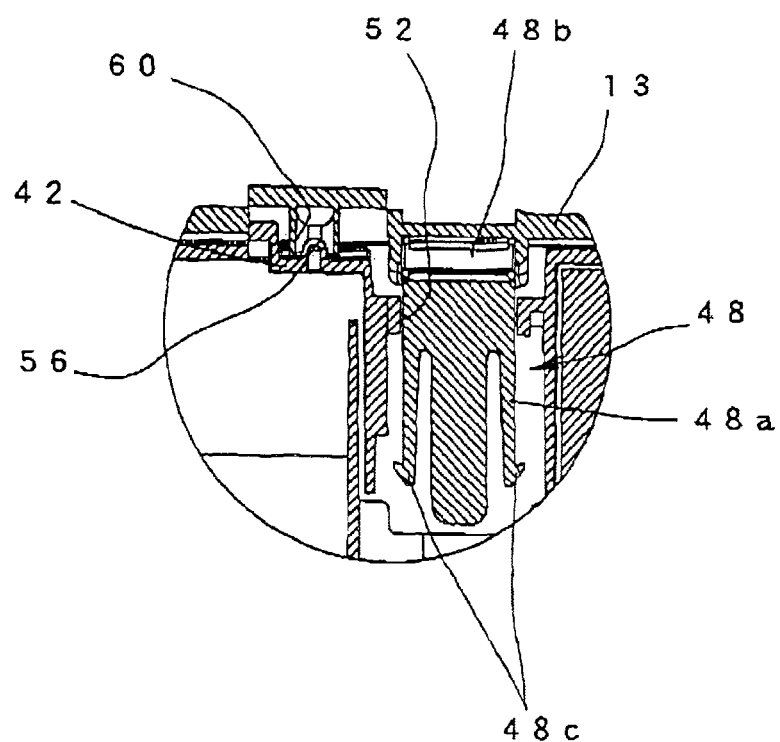
FIG. 7 shows an enlarged perspective view of the right side connection of the cover and the main body of the scanner of FIG. 3.

FIG. 6 shows an enlarged perspective view of the left side connection of the cover 13 and the main body 42 of the scanner 12 of FIG. 3. FIG. 7 shows an enlarged perspective view of the right side connection of the cover 13 and the main body 42 of the scanner 12 of FIG. 3.

The sliding portions 46*a*, 48*a* each have quadratic pillar shape. As shown in FIG. 6 and FIG. 7, the sliding portions 46*a*, 48*a* are slidably inserted into the insert holes 50, 52 respectively. The sliding portions 46*a*, 48*a* are formed smaller than the insert holes 50, 52 so that after the sliding portions 46*a*, 48*a* are respectively inserted into the insert holes 50, 52, the sliding portions 46*a*, 48*a* are each able to slide therein.

Notches are formed respectively at one end of the sliding portions 46*a*, 48*a* in the axis direction thereof. Resilient hook portions 46*c*, 48*c* are formed with the notches respectively on the sliding portions 46*a*, 48*a*. The hook portions 46*c*, 48*c* protrudes outwards, each over the periphery of the insert holes 50, 52. In the course of inserting the sliding portions 46*a*, 48*a* into the insert holes 50, 52, the hook portions 46*a*, 48*a* are resiliently bent inwards.

The pair of the insert holes 50, 52 are disposed vertically to the glass plate 16. The length of the sliding portions 46*a*, 48*a* in the axis direction is longer than the length of the insert holes 50, 52 in its axis direction. Thus, the sliding portions 46*a*, 48*a* are able to slide in the axis direction (the up and down direction) inside the insert holes 50, 52, at a certain amount of stroke. The sliding portions 46*a*, 48*a* can slide within the range where the hook portions 46*c*, 48*c* or the rotation support portions 46*b*, 48*b* comes in contact with either peripheral ends of the insert holes 50, 52. With such configuration, the cover 13 is able to slide in the vertical direction with respect to the top surface (the glass plate 16) of the main body 42.

As clearly shown in FIG. 5, the rotation support portions 46*b*, 48*b* are C-shaped in their sectional phase. The rotation support portions 46*b*, 48*b* are connected with the shafts 13*a*, 13*b* of the cover 13 respectively, and are able to rotate around the shafts 13*a*, 13*b*.

Two sets of a pin and a pin hole are formed on the cover 13 and the main body 42. The set of pin 54 and pin hole 58 is disposed in the vicinity of the hinge 46 on the left side, and the other set of pin 56 and pin hole 60 is disposed in the vicinity of the hinge 48 on the right side. It is preferable that the two sets of pin 54, 56 and pin hole 58, 60 are disposed in the nearing of the hinges 46, 48, and far-off from the glass plate 16 as possible. It is also preferable that at least two of such sets are formed within the area.

Figure 8:
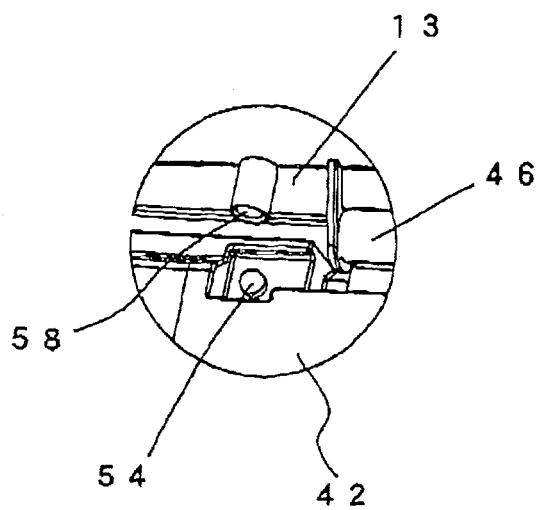
FIG. 8 shows an enlarged perspective view of the A part of FIG. 4.

FIG. 8 shows an enlarged perspective view of the A part of FIG. 4. As shown in FIG. 8, of set of pin 46 and pin bole 58 disposed in the vicinity of the left side hinge 46, the pin 46 is formed on the main body 42, and the pin hole 58 is formed on the cover 13. It is also possible that the pin 46 is formed on the cover 13 and the pin hole 58 is formed on the main body 42.

The pin 54 has a columnar shape. The pin 54 stands on the main body 42 in the vertical direction with respect to the glass plate 16. The cross sectional shape of the pin hole 58, into which the pin 54 can be inserted, is round. The pin 54 can be inserted into the pin hole 58 in the course of closing the cover 13 to its closed state; that is, a state where the cover 13 makes contact with the glass plate 16. It is preferable that the recess between the pin 54 and the pin hole 58 is small as possible.

The pin hole 58 is tapered, with the periphery of the pin hole 58 narrowing from the side that makes contact with the main body 42 to the interior side. When inserting the pin 54 into the pin hole 58 in the course of closing the cover 13, the pin 54 is guided along the tapered slope of the pin hole 58 from the side that makes contact with the main body 42 to the interior side of the pin hole 58. When the cover 13 is closed, the pin 54 and the pin hole 58 are engaged closely at the most-interior end, thus settled to maintain the alignment thereof. When pulling the pin 54 out from the pin hole 58 in the course of opening the cover 13, the pin 54 is again guided along the tapered slope of the pin hole 58 from the interior side of the pin hole 58 to the side that makes contact with the main body 42. Even when the pin 54 and the pin hole 58 are engaged closely at the most-interior end, the tapered slope guides the pin 54 out smoothly.

Figure 9:
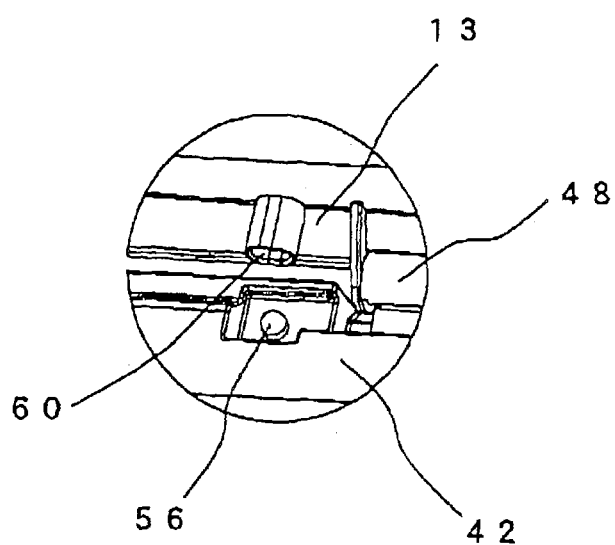
FIG. 9 shows an enlarged perspective view of the B part of FIG. 4.

FIG. 9 shows an enlarged perspective view of the B part of FIG. 4. As shown in FIG. 8, of the set of pin 56 and pin hole 60 disposed in the vicinity of the right side hinge 48, the pin 56 is formed on the main body 42, and the pin hole 60 is formed on the cover 13. It is also possible that the pin 56 is formed on the cover 13 and the pin hole 60 is formed on the main body 42.

As is the case with the pin 54 on the left side, the pin 56 has a columnar shape. It is standing on the main body 42 in the vertical direction with respect to the glass plate 16. The pin 56 can be inserted into the pin hole 60 in the course of closing the cover 13 to its closed state.

Furthermore, the cross sectional shape of the pin hole 60, into which the pin 56 can be inserted, is elongated round. In the present embodiment, the pin hole 60 has half round corners with parallel sides connecting the two corners. The pin hole 60 can also be formed in other elongated round shapes; for example, an oval, or an ellipse. The round shape of the pin hole 60 is elongated in the axis direction of the shafts 13*a*, 13*b* of the cover 13 (that is, the left and right direction). It is preferable that the recess in the forward and rear direction between the pin 56 and the pin hole 60 is small as possible.

The pin hole 60 is tapered, with the periphery of the pin hole 60 narrowing from the side that makes contact with the main body 42 to the interior side. When inserting the pin 56 into the pin hole 60 in the course of closing the cover 13, the pin 56 is guided along the tapered slope of the pin hole 60 from the side that makes contact with the main body 42 to the interior side of the pin hole 60. When the cover 13 is closed, the pin 54 and the pin hole 60 are engaged closely at the most-interior end, thus settled to maintain the alignment thereof. When pulling the pin 56 out from the pin hole 60 in the course of opening the cover 13, the pin 56 is again guided along the tapered slope of the pin hole 60 from the interior side of the pin hole 60 to the side that makes contact with the main body 42. Even when the pin 56 and the pin hole 60 are engaged closely at the most-interior end, the tapered slope guides the pin 56 out smoothly.

The operation of the scanner 12 and the multi-function device 1 of the present embodiment will be described below.

Firstly, to scan a document, the cover 13 is rotated around the shafts 13*a*, 13*b* in the upper direction to a state in which the cover 13 is opened as shown in FIG. 4. After the document is placed on the glass surface 16 at a predetermined position, the cover 13 is rotated around the shafts 13*a*, 13*b* in the lower direction to a state which the cover 13 is closed.

When closing the cover 13, the cover 13 rotates around the shafts 13*a*, 13*b* in the lowering direction. The glass plate 16 is then covered with the cover 13, and the pin 54 disposed in the vicinity of the left side hinge 46 is inserted into the pin hole 58, and the pin 56 disposed in the vicinity of the right side hinge 48 is inserted into the pin hole 60.

Since the pin hole 58 on the left side has a round shape, the columnar-shaped pin 54 and the pin hole 58 are engaged when the pin 54 is inserted into the pin hole 58. The position of the pin 54 in the forward and rear direction as well as the left and right direction is determined. Further, since the pin hole 60 on the right side has an elongated round shape, the position of the cover 13 in the rotating direction with respect to the pin 54 as the rotating center is determined, thus determining the position of the cover 13. Whenever the cover 13 is opened or closed, the position of the cover 13 is determined each time with identical alignment to the main body 42.

Misalignment of the cover 13 and the main body 42 is prevented, thus maintaining the appearance of the scanner 12. This is preferable from the perspective of design. Furthermore, the document being scanned in a tilted angle or only part of the document being scanned is prevented.

That is, when a brief recess is yielded between the shafts 13a, 13b of the cover 13 and the rotation support portions 46b, 48b of the hinge 46, 48, or between the insert holes 50, 52 and the sliding portions 46a, 48a of the hinge 46, 48, the recess causes the cover 13 to shift in a misaligning direction in the forward and rear direction as well as the left and right direction.

Without the sets of pins 54, 56 and pin holes 58, 60, the cover 13 may shift the position of the document placed on the glass plate 16 from the predetermined position due to the recess yielded. By determining the position of the cover 13 with the pins 54, 56 and the pin holes 58, 60, the shift in the position of the document is effectively prevented.

The two sets, the set of pin 54 and pin hole 58, and the set of pin 56 and pin hole 60, are disposed in the vicinity of the hinges 46, 48 respectively. In the case of placing a document that is larger than the size of the glass plate 16, the document can be placed with its edges pushing out from the left and right side and the front side. In such case, the above configuration prevents the document being pinched in between the pin and pin hole, and thus being damaged. Hence, though disposing two sets, the set of pin 54 and pin hole 58, and the set of pin 56 and pin hole 60, the document can be scanned without causing any flaw on the document paper.

In the case where the document is, for example, a book of a thick volume, the sliding portions 46a, 48a of the hinges 46, 48 slide within the insert holes 50, 52 in the course of covering the thick document by the cover 13. By the sliding of the sliding portions 46a, 48a, the cover 13 can make space for the thick document while maintaining parallelism between the cover 13 and the glass plate 16. In such case, the pins 54, 56 are not suspended within the pin holes 58, 60.

After the cover 13 is closed, the operation panel 14 can be operated to start the scan. The CIS 17 moves along the guide shaft 38 under the glass plate 16, and the CIS 17 scans the thick document.

To print the scanned document, feed-in roller 6b and the resilient separator pad of the inclined separator 8 send out one printing paper P at a time from the paper cassette 3. The printing paper P is supplied to the printing member 7 via the paper feeding passage 9. In the printing member 7, ink is discharged from the print head 4 onto the printing paper P according to the image data that the CIS 17 had scanned. The printing paper P is sent in the paper feed-out direction, from the printing member 7 to the paper feed-out member 10.

(Second Embodiment)

The scanner 12 of the first embodiment as described above had a flat bed mechanism. The flat bed mechanism is a scanning mechanism to scan a document placed on top of a flat glass plate. The second embodiment will describe of a scanner having the flat bed mechanism as well as the auto document feeding mechanism using an auto document feeder.

The second embodiment of the present invention will be described in detail below with reference to the figures. The parts in common with the figures of the first embodiment are given the same numbering as the first embodiment. Detailed description of such parts is abridged.

Figure 10:
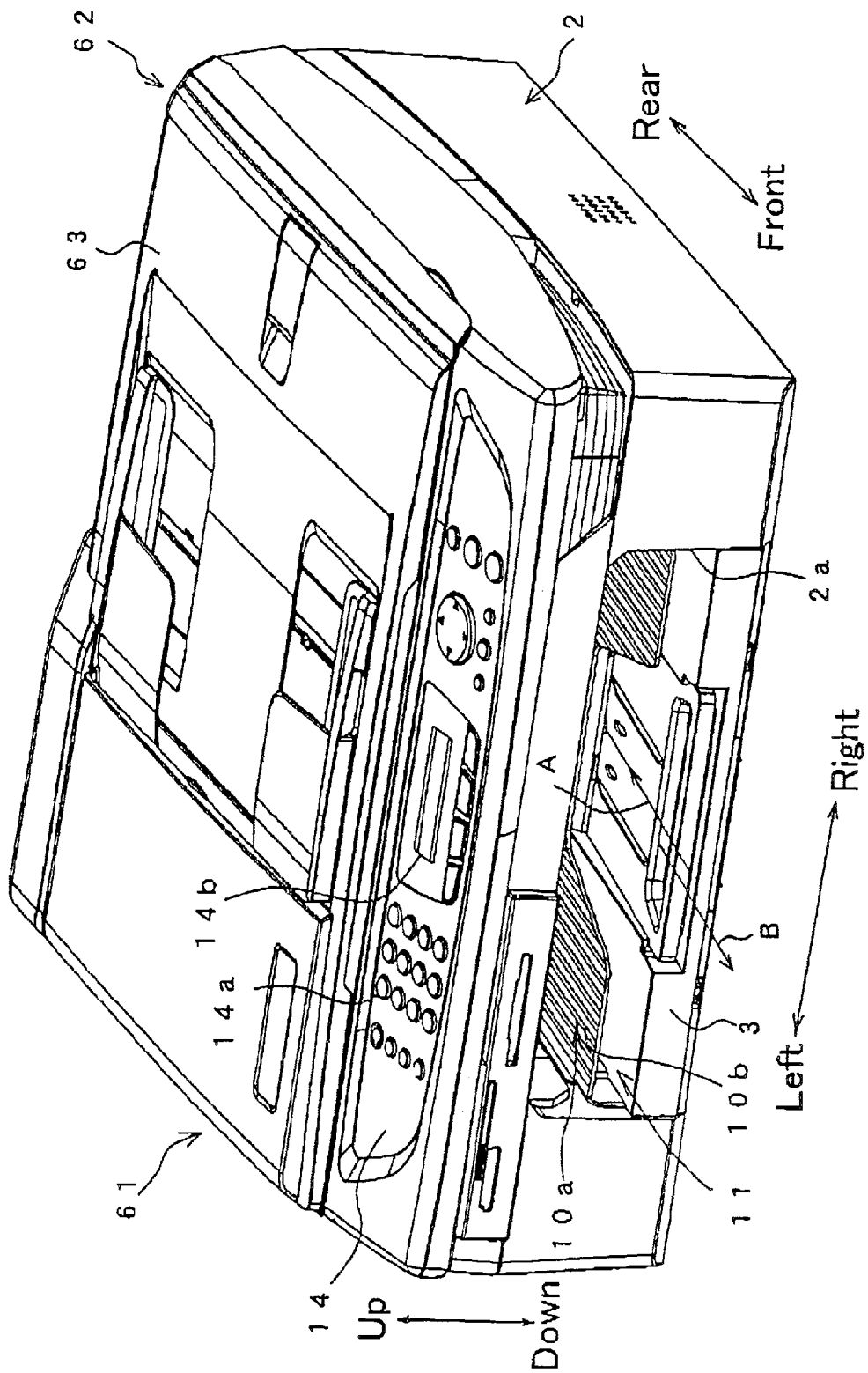
FIG. 10 shows a perspective view of the multi-function device comprising an scanner having a flat bed mechanism and an auto document feeding mechanism.

FIG. 10 shows a perspective view of the multi-function device 61 comprising a scanner 62 having a flat bed mechanism and an auto document feeder 70. The multi-function device 61 comprises a scanner 62 and a housing 2. As it was in the first embodiment, the scanner 62 is formed on the upper side of the housing 2. The scanner 62 is fixed on the housing 2 of the multi-function device 61.

Furthermore, a cover 63 that covers the upper surface of the scanner 62 is connected to the scanner 62. The cover 63 rotates with respect to the scanner 62, with the axis of the rotation at its rear side.

Figure 11:
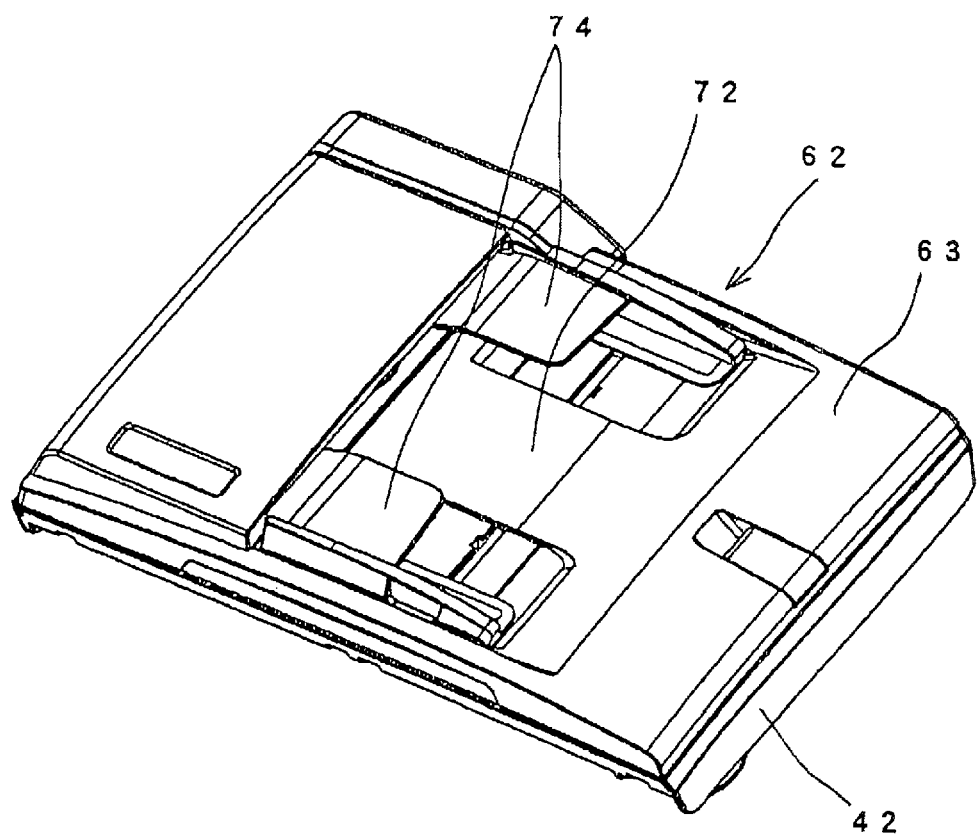
FIG. 11 shows a perspective view of the scanner removed from the multi-function device of FIG. 10.
Figure 12:
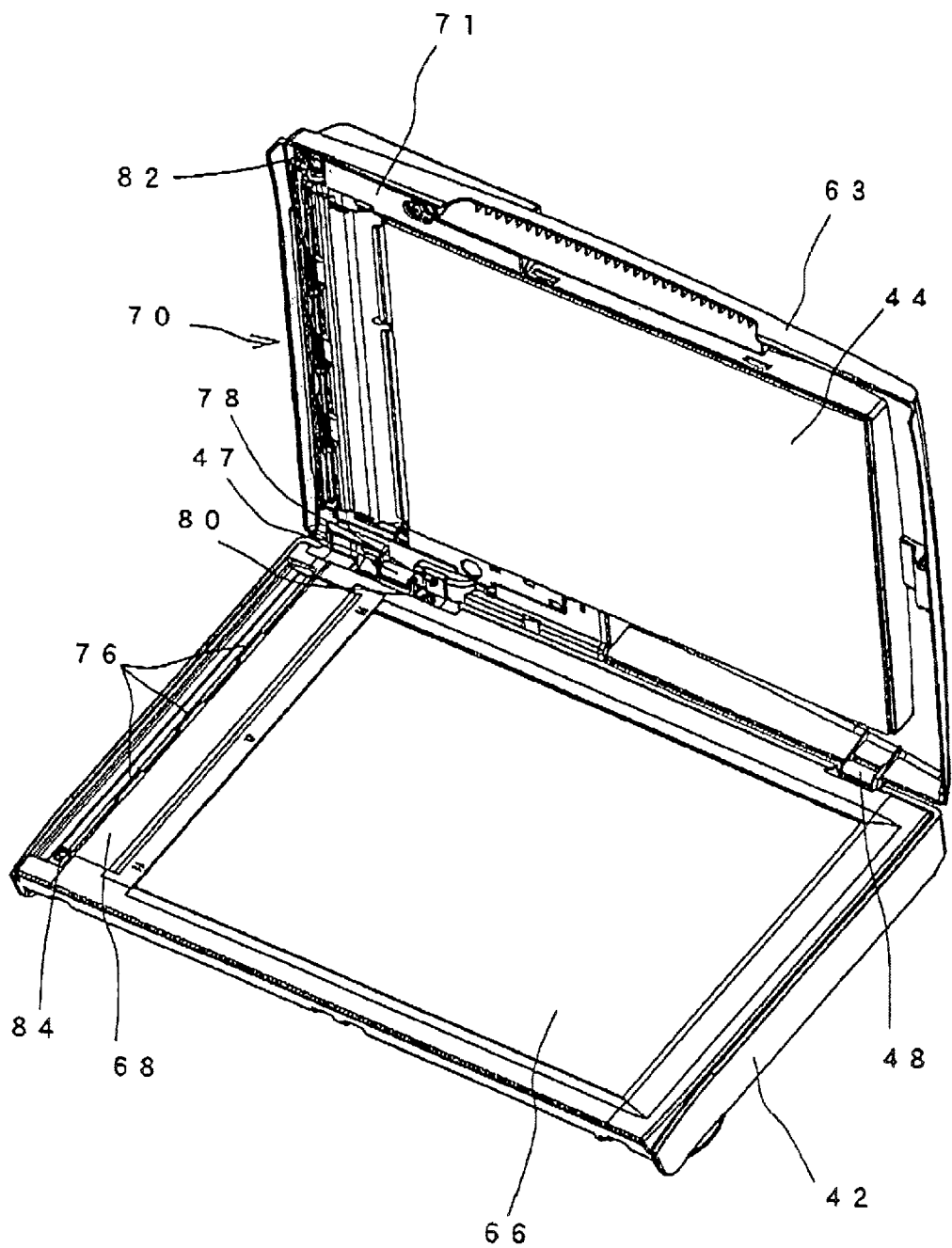
FIG. 12 shows a perspective view of the scanner of FIG. 11, with its cover opened.
Figure 13:
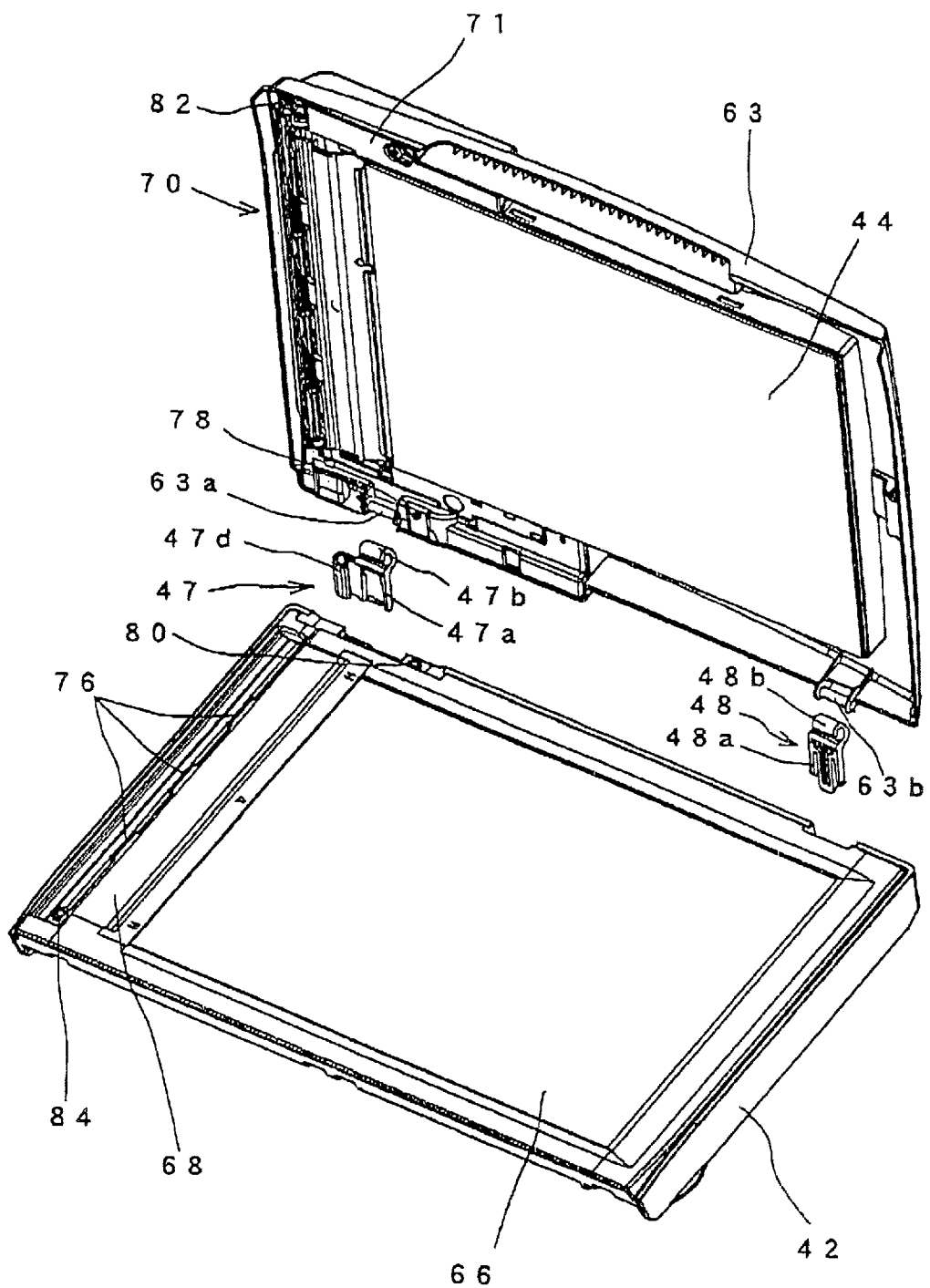
FIG. 13 shows a perspective view of the decomposed elements of the scanner of FIG. 11.

FIG. 11 shows a perspective view of the scanner 62 removed from the multi-function device 61 of FIG. 10. FIG. 12 shows a perspective view of the scanner 62 of FIG. 11, with its cover 63 opened. FIG. 13 shows a perspective view of the decomposed elements of the scanner 62 of FIG. 11.

As shown in FIG. 11 and FIG. 12, on the upper surface of the main body 42 of the scanner 62, a first glass plate 66 is formed. The first glass plate 66 has a rectangular shape, and the documents can be placed on top. On the bottom surface of the cover 63, that is, on the surface side which makes contact with the first glass plate 66 in its closed state, a rectangular-shaped weight sponge 44 is adhered. The weight sponge 44 covers the area of the first glass plate 66 where the document is to be placed. In the course of scanning the document, the weight sponge 44 holds the document down onto the first glass plate 66.

The first glass plate 66 is used in the scan using the flat bed mechanism. As it was with the first embodiment, the scanner 62 of the present embodiment scans the document placed on the first glass plate 66 with the Contact Image Sensor (CIS) 17 disposed underneath the first glass plate 66.

Arranged on the left side of the first glass plate 66, a second glass plate 68 is disposed on the top surface of the main body 42. The second glass plate 68 has a rectangular shape, with its width in the left and right direction being shorter than that of the first glass plate 66. The first glass plate 66 and the second glass plate 68 are disposed on the same plane.

Underneath the second glass plate 68, the aforementioned CIS 17 is disposed. The CIS 17 is disposed in a manner that it moves back and forth along the guide shaft 38 beneath the first glass plate 66 and the second glass plate 68.

As shown in FIG. 13, at the rear side of the cover 63 and the main body 42, a hinge 47 is disposed on the left side, and a hinge 48 is disposed on the right side. The pair of hinges 47, 48 include sliding portions 47a, 48a and rotation support portions 47b, 48b respectively. The hinge 48 on the right side is similar to the hinges described in the first embodiment. The hinge 47 on the left side differs from the hinges described in the first embodiment in that it further includes a cable clamp portion 47d along with other portions 47a, 47b, and 47c.

As is the case with the first embodiment, the sliding portions 47b, 48b are slidably inserted into the insert holes 50, 52 respectively. The sliding portions 47b, 48b are configured so that each is able to slide vertically to the glass plate 16 at a certain amount of stroke. The rotation support portions 47b, 48b are respectively connected with the shafts 63a, 63b disposed at the rear side of the cover 63. The rotation support portions 47b, 48b respectively rotate around the shafts 63a, 63b. With such configuration, the cover 63 is able to slide in the vertical direction with respect to the top surface (the first and second glass plates 66, 68) of the main body 42.

In the present embodiment, the cover 63 further includes an auto document feeder 70. The auto document feeder 70, as shown in FIG. 11, includes a document feed-in tray 72 and a document feed-out tray 74 on the upper surface of the cover 63. The auto document feeder 70 sends the document placed on the document feed-in tray 72 by rotatably driving the feed-in roller 75, which is disposed with its axis direction perpendicular to the document feed-in direction. In the present embodiment, the document feed-in direction is parallel to the rear edge of the cover 63, where the hinges 47, 48 are connected. The document is sent through the cover 63, exposing the document to the surface of the second glass plate 68.

After the document passes over the second glass plate 68, the edge of the document is leaped upward by a plurality of leaper 76 formed on the main body 42. The document, having passed over the second glass plate 68, is guided again by the auto document feeder 70 of the cover 63, onto the document feed-out tray 74. The leaper 76 is a protrusion which protrudes higher than the surface of the second glass plate 68 in order to leap the document upward.

The second glass plate 68 is used when scanning the documents with the auto document feeder 70. When scanning documents with the auto document feeder 70, the documents are placed on the document feed-in tray 72. The auto document feeder 70 sends the document from the document feed-in tray 72 to the document feed-out tray 74. The CIS 17 is halted underneath the second glass plate 68 as it scans the document as the document is run through over the second glass plate 68. That is, the document moves across over the CIS 17 that is remaining still under the second glass plate 68 during the scan.

Figure 14:
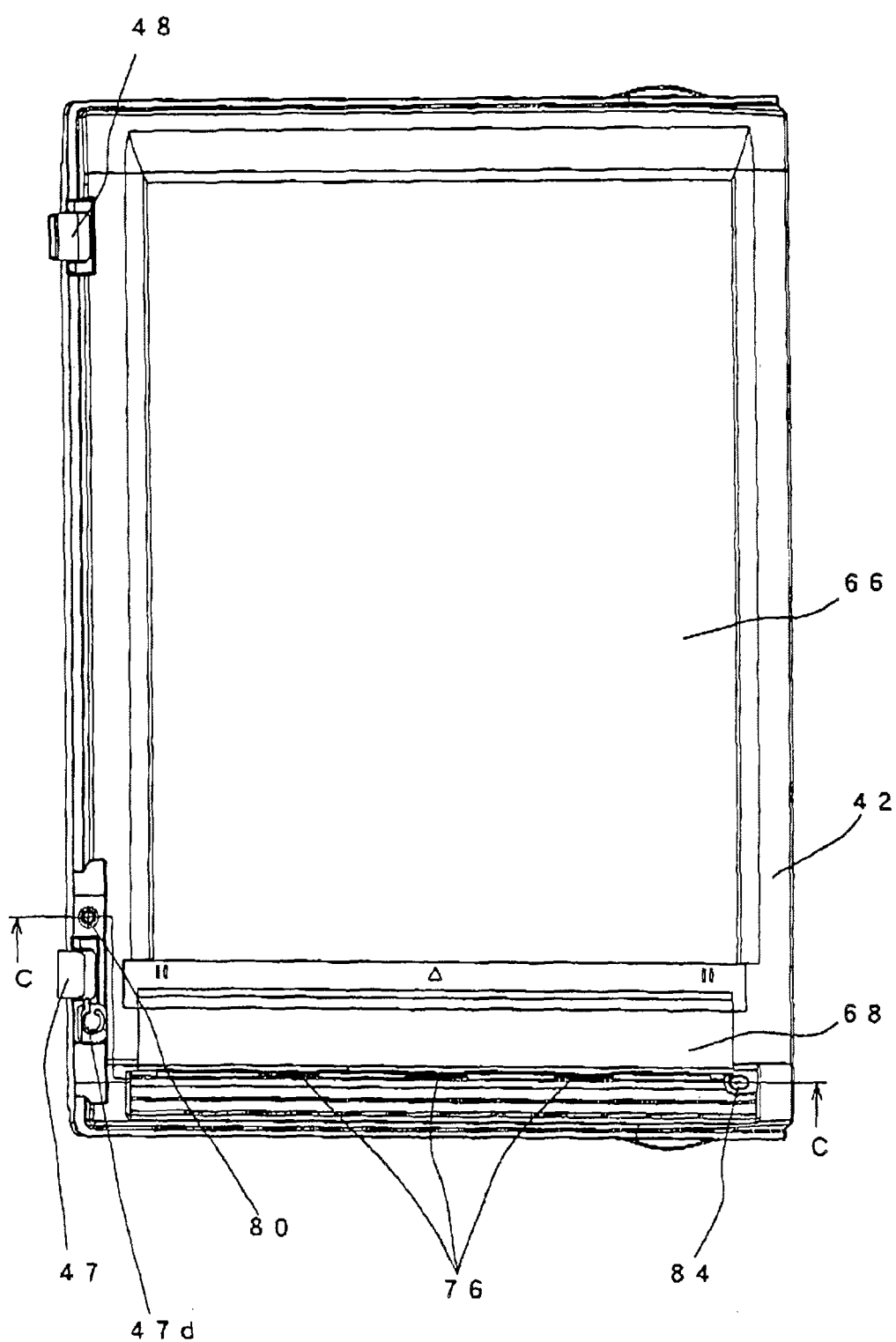
FIG. 14 shows an enlarged plane view of the scanner of FIG. 11, with its cover removed.
Figure 15:
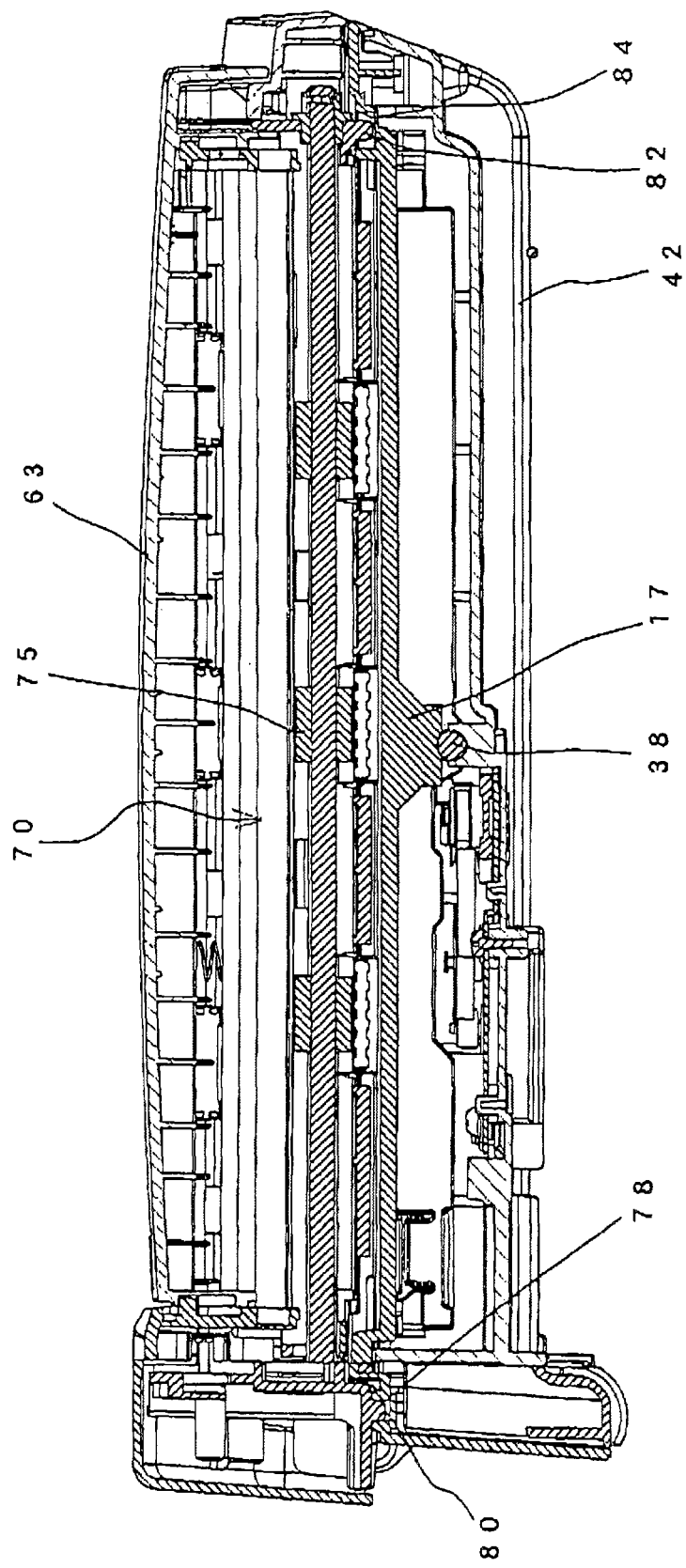
FIG. 15 shows a cross-sectional side view of the scanner of FIG. 14.

FIG. 14 shows an enlarged plane view of the scanner 62 of FIG. 11, with its cover 63 removed. FIG. 15 shows a cross-sectional view of the scanner 62 of FIG. 14.

As shown in FIG. 12 to FIG. 15, the cover 63 and the main body 42 has two sets of pin and pin hole, of which include pins 78, 82 and a pin holes 80, 84 respectively in each set. One set is disposed at each end of the feed-in roller 75 of the auto document feeder 70. The set of pin 78 and pin hole 80 is disposed in the vicinity of the hinge 47 on the left side. On the other hand, the set of pin 82 and pin hole 84 is disposed on the other end side of the feed-in roller 75. The set of pin 82 and pin hole 84 is formed on the outer side of the second glass plate 68, in the vicinity of the front-most leaper 76 disposed on the main body 42. It is preferable that the two sets are disposed farther away from the first glass plate 66 as possible.

In the present embodiment, the pin 78 is disposed on the cover 63 and the pin hole 80 is disposed on the main body 42. The pin 78 may be formed on the main body 42 and the pin hole 80 may be formed on the cover 63.

Of the set of pin 78 and pin hole 80 that is disposed in the vicinity of the hinge 47 on the left side, the pin 78 has a columnar shape. The cross sectional shape of the pin hole 80, into which the pin 78 can be inserted, is round. The pin 78 can be inserted into the pin hole 80 in the course of closing the cover 63 to its closed state, that is, a state where the cover 63 makes contact with the first glass plate 66 and the second glass plate 68. The pin hole 80 stands on the main body 42 in vertical direction with respect to the first glass plate 66. Further, the pin hole 80 is tapered, with the periphery of the pin hole 80 narrowing from the side that makes contact with the cover 63 to the interior side. The pin hole 80 guides the pin 78 along the tapered slope in the course of inserting the pin 78 therein and pulling the pin 78 therefrom.

Of the other set of pin 82 and pin hole 84 of the present embodiment, the pin 82 is formed on the case 71 of the auto document feeder 70 attached to the cover 63, and the pin hole 60 is formed on the main body 42. The pin 82 may be formed on the main body 42 and the pin hole 84 may be formed on the case 71.

As is the case with the pin 78 on the other side, the pin 82 has a columnar shape. The cross sectional shape of the pin hole 84 is an elongated round shape. In the present embodiment, the pin hole 84 has half round corners with parallel sides connecting the two corners. The round shape of the pin hole 84 is elongated in a direction that is perpendicular to the axis direction of the shafts 63a and 63b of the cover 63; that is, the front and rear direction. The pin hole 84 can also be formed in other elongated round shapes; for example, an oval, or an ellipse.

The pin hole 84 stands on the main body 42 in vertical direction with respect to the first glass plate 66. The pin 82 can be inserted into the pin hole 84 in the course of closing the cover 63 to its closed state.

The pin 82 and the pin hole 84 are formed so that the recess in the left and right direction between the pin 82 and the pin hole 84 is as small as possible. Further, the pin hole 84 is tapered, with the periphery of the pin hole 84 narrowing from the side that makes contact with the cover 63 to the interior side. The pin hole 84 guides the pin 80 along the tapered slope in the course of inserting the pin 80 therein and pulling the pin 80 therefrom.

The operation of the scanner 62 of the present embodiment will be described below.

Firstly, to scan a document using the flat bed mechanism, the cover 63 is rotated around the shafts 63a, 63b in the upper direction to a state in which the cover 13 is opened as shown in FIG. 12. After the document is placed on the first glass surface 66 at a predetermined position, the cover 63 is rotated around the shafts 63a, 63b in the lower direction to a state which the cover 63 is closed, covering the first glass plate 66.

When closing the cover 63, the cover 63 rotates around the shafts 63a, 63b in the lowering direction. The first glass plate 66 is then covered with the cover 63, and the pin 78 disposed in the vicinity of the left side hinge 47 is inserted into the pin hole 80, and the pin 82 disposed on the other end of the feed-in roller 75 is inserted into the pin hole 84.

Since the pin hole 80 of the left side has a round shape, the position of the pin 78 in the forward and rear direction as well as the left and right direction is determined by inserting the pin 78 into the pin hole 80. Further, since the other pin hole 84 has an elongated round shape, the position of the cover 63 in the rotating direction with respect to the pin 78 as the rotating center is determined, thus determining the position of the cover 63. Whenever the cover is opened or closed, the position of the cover 63 is determined each time with identical alignment to the main body 42.

Misalignment of the cover 63 and the main body 42 is prevented, thus maintaining the appearance of the scanner 62. That is preferable from the perspective of design. Furthermore, the document being scanned in a tilted angle or only part of the document being scanned is prevented.

That is, when a brief recess is yielded between the shafts 63a, 63b of the cover 63 and the rotation support portions 47b, 48b of the hinges 47, 48, or between the main body 42 and the sliding portions 47a, 48a of the hinges 47, 48, the recess causes the cover 63 to shift in a misaligning direction in the forward and rear direction as well as the left and right direction.

Without the sets of pins 78, 82 and the pin holes 80, 84, the cover 63 may shift the position of the document placed on the first glass plate 66 from the predetermined position due to the brief recess yielded. By determining the position of the cover 63 with the pins 78, 82 and the pin holes 82, 84, the shift in the position of the document is effectively prevented.

As is also the case with the first embodiment, in the case where the document is, for example, a book of a thick volume, the sliding portions 47a, 48a of the hinges 47, 48 respectively slide upward within the insert holes in the course of covering the thick document by the cover 63. By the sliding of the sliding portions 47a, 48a, the cover 63 can make space for the thick document while maintaining parallelism between the cover 63 and the first glass plate 66. In such case, the pins 78, 82 are not inserted into the pin holes 80, 84.

On the other hand, to scan a document using the auto document feeder 70, the cover 63 is rotated around the shafts 63a, 63b in the lowering direction to a state which the cover 63 is closed, covering the first glass plate 66 and the second glass plate 68.

When closing the cover 63, the pin 78 disposed in the vicinity of the left side hinge 47 is inserted into the pin hole 80, and the pin 82 disposed on the other end of the feed-in roller 75 is inserted into the pin hole 84. The position of the cover 63 to the main body 42 is determined each time with identical alignment whenever the cover 63 is opened or closed.

When scanning a document using the auto document feeder 70, the auto document feeder 70 sends the document placed on the document feed-in tray 72 by rotatably driving the feed-in roller 75. The document is sent through the cover 63, exposing the document to the surface of the second glass plate 68. The edge of the document is leaped upwards by the leaper 76, and the document is sent to the document feed-out tray 74. The CIS 17 remains still underneath the second glass plate 68. The CIS 17 scans the document as the document is run through over the second glass plate 68.

The two sets, the set of pin 78 and pin hole 80 and the set of pin 82 and pin hole 84, determines the alignment of the cover 63 and the main body 42, which determines the alignment of the axis direction of the feed-in roller 75 and the CIS. The document sent by the feed-in roller 75 is fed in the same direction each time. A shifting of the direction of which the document is sent is prevented. Furthermore, the document being scanned in a tilted angle and malfunction of the auto document feeder 70 is prevented.

Moreover, the sets of pins 78, 82 and pin holes 80, 84 are disposed on the second glass plate 68 side. In the course of scanning a document larger than the first glass plate 66 with the flat bed mechanism, the document can be placed on the first glass plate 66 with the edges of the document pushing out from the right side and front side. In such case, the above configuration prevents the document being pinched in between either of the pins 78, 82 and pin holes 80, 84, and thus being damaged. Hence, though disposing the set of pin 78 and pin hole 80, and the set of pin 82 and pin hole 84, the document can be scanned without causing any flaw on the document paper.

Moreover, the leaper 76 is protruding higher than the surface of the second glass plate 68. Hence, though disposing the set of pin 78 and pin hole 80 and the set of pin 82 and pin hole 84, the sets will not restrict the placement of large documents onto the first glass plate 66.

The technical concept of the present invention is not limited to the above embodiments. The present invention can be embodied in various ways within a range that does not deviate from the substance thereof.

What is claimed is:

1. A scanner comprising:
a main body including a first transparent plate on the top surface;
a hinge connected to the main body;
a cover member connected to the hinge, wherein the cover member has a bottom surface, the cover member rotates using the hinge with respect to the main body between an opened state and a closed state, and the bottom surface is in contact with the top surface of the main body in the closed state; and
first and second sets, each set comprising a protrusion and a recess, wherein the protrusion is formed on one of the top surface of the main body and the bottom surface of the cover member, and the recess is formed on the other of the top surface of the main body and the bottom surface of the cover member,
wherein in each of the first and second sets, the protrusion is inserted into the recess when the cover member rotates using the hinge from the opened state to the closed state, and the protrusion is pulled out from the recess in accordance with a rotation of the cover member when the cover member rotates using the hinge from the closed state to the opened state,
in a plan view of the first transparent plate, each of the first and second sets is positioned at a different position from where the hinge is arranged, the first set being positioned closer to the hinge than the second set in a direction perpendicular to a rotation axis of the hinge,
the first set comprises a first protrusion and a first recess which determine a position of the cover member with respect to the main body in a first direction, and
the second set comprises a second protrusion and a second recess which determine a position of the cover member with respect to the main body in a second direction that is different from the first direction, the second recess having a different shape from the first recess, and the second recess having an elongated shape that is elongated in the direction perpendicular to the rotation axis of the hinge.

2. The scanner as in claim 1, wherein
the first transparent plate comprises a pair of edges that extend parallel to each other and parallel to the direction perpendicular to the rotation axis of the hinge, and
in the plan view of the first transparent plate, both the first and second sets are positioned closer to one of the pair of edges than the other of the pair of edges in a direction of the rotation axis of the hinge.

3. The scanner as in claim 1, wherein
the first recess is a hole having a round shape.

4. The scanner as in claim 1, wherein
the cover member comprises an auto document feeder,
the main body further includes a second transparent plate that is positioned adjacent to the first transparent plate in a direction of the rotation axis of the hinge, the second transparent plate being configured to be used for a scan of a document which is fed by the auto document feeder,
the second transparent plate comprises a first plate-edge and a second plate-edge that extend parallel to each other and parallel to the direction of the rotation axis of the hinge, the first plate-edge being positioned closer to the hinge than the second plate-edge in the direction perpendicular to the rotation axis of the hinge, and
in the plan view of the first and second transparent plates, the first set is positioned adjacent to the first plate-edge of the second transparent plate.

5. The scanner as in claim 4, wherein
in the plan view of the first and second transparent plates, the first set is positioned between the first plate-edge of the second transparent plate and the hinge in the direction perpendicular to the rotation axis of the hinge.

6. The scanner as in claim 1, wherein
the cover member comprises an auto document feeder,
the main body further includes a second transparent plate that is positioned adjacent to the first transparent plate in a direction of the rotation axis of the hinge, the second transparent plate being configured to be used for a scan of a document which is fed by the auto document feeder,
the second transparent plate comprises a first plate-edge and a second plate-edge that extend parallel to each other and parallel to the direction of the rotation axis of the hinge, the first plate-edge being positioned closer to the hinge than the second plate-edge in the direction perpendicular to the rotation axis of the hinge, and
in the plan view of the first and second transparent plates, the second set is positioned adjacent to the second plate-edge of the second transparent plate.

7. The scanner as in claim 6, wherein
the main body comprises a first body-edge that is adjacent to the second plate-edge of the second transparent plate and extends parallel to the second plate-edge of the second transparent plate, and
in the plan view of the first and second transparent plates, the second set is positioned between the second plate-edge of the second transparent plate and the first body-edge of the main body in the direction perpendicular to the rotation axis of the hinge.

8. The scanner as in claim 6, wherein
the second transparent plate further comprises a third plate-edge and a fourth plate-edge that extend parallel to each other and parallel to the direction perpendicular to the rotation axis of the hinge, the third plate-edge being positioned closer to the first transparent plate than the fourth plate-edge in the direction of the rotation axis of the hinge,
the main body comprises a second body-edge that is adjacent to the fourth plate-edge of the second transparent plate and extends parallel to the fourth plate-edge of the second transparent plate, and
in the plan view of the first and second transparent plates, the second set is positioned between the fourth plate-edge of the second transparent plate and the second body-edge of the main body in the direction of the rotation axis of the hinge.

* * * * *